(12) United States Patent
Moriarty

(10) Patent No.: US 7,370,508 B2
(45) Date of Patent: May 13, 2008

(54) ROTOR POSITION DETECTION IN AN ELECTRICAL MACHINE

(75) Inventor: Peter Mark Moriarty, Knaresborough (GB)

(73) Assignee: Switched Reluctance Drives Limited, Harrogate, North Yorkshire (GB)

( * ) Notice: Subject to any disclaimer, the term of this patent is extended or adjusted under 35 U.S.C. 154(b) by 366 days.

(21) Appl. No.: 11/159,932

(22) Filed: Jun. 23, 2005

(65) Prior Publication Data

US 2006/0005605 A1 Jan. 12, 2006

(30) Foreign Application Priority Data

Jul. 6, 2004 (GB) ................. 0415163.5

(51) Int. Cl.
*G01C 17/38* (2006.01)
(52) U.S. Cl. ....................................... 73/1.75
(58) Field of Classification Search .............. 73/1.75
See application file for complete search history.

(56) References Cited

U.S. PATENT DOCUMENTS

| | | | |
|---|---|---|---|
| 4,216,419 A * | 8/1980 | van Dam et al. | ........... 388/813 |
| 4,972,333 A | 11/1990 | Ishikawa | |
| 5,170,365 A | 12/1992 | Collopy et al. | |
| 5,225,746 A | 7/1993 | von der Heide et al. | |
| 5,467,025 A | 11/1995 | Ray | |
| 5,786,646 A | 7/1998 | Newberg et al. | |
| 5,877,568 A | 3/1999 | Maes et al. | |
| 6,147,626 A | 11/2000 | Sakakibara | |
| 6,586,903 B2 | 7/2003 | Moriarty | |
| 6,661,140 B2 | 12/2003 | Agnes et al. | |
| 6,826,499 B2 | 11/2004 | Colosky et al. | |
| 2002/0125852 A1 | 9/2002 | McClelland et al. | |
| 2002/0193935 A1* | 12/2002 | Hashimoto et al. | ......... 701/110 |
| 2006/0009936 A1 | 1/2006 | Moriarty et al. | |
| 2006/0036384 A1 | 2/2006 | Moriarty et al. | |
| 2006/0036385 A1 | 2/2006 | Tankard | |

FOREIGN PATENT DOCUMENTS

| | | |
|---|---|---|
| EP | 0 391 647 A3 | 10/1990 |
| EP | 0 573 198 A1 | 12/1993 |
| EP | 0 780 966 A2 | 6/1997 |
| EP | 1 014 556 A1 | 6/2000 |
| EP | 1 109 309 A2 | 6/2001 |

OTHER PUBLICATIONS

Stephenson, et al., "The Characteristic, Design and Applications of Switched Reluctance Motors and Drives," PCIM '93, Nürnberg, Germany, Conference & Exhibition, Jun. 21-24, 1993, pp. 1-68.

* cited by examiner

*Primary Examiner*—Robert Raevis
(74) *Attorney, Agent, or Firm*—Haynes and Boone, LLP

(57) ABSTRACT

An electrical machine has a rotor position transducer which provides output signals to a control system. The output signals contain errors due to component shortcomings and manufacturing imperfections. An apparatus is disclosed which is able to determine the errors in the signals and provide compensations to the control system of the machine. The compensations may be stored in the control system and used to improve the accuracy of the transducer output signals, thus improving the output of the machine.

29 Claims, 4 Drawing Sheets

ROTOR POSITION DETECTION IN AN ELECTRICAL MACHINE

CROSS-REFERENCE TO RELATED APPLICATION

The subject matter of this application is related to the subject matter of British Patent Application No. GB 0415163.5, filed Jul. 6, 2004, priority to which is claimed under 35 U.S.C. § 119 and which is incorporated herein by reference.

BACKGROUND OF THE INVENTION

1. Field of the Invention

Embodiments of this invention relate to the compensation of errors in the rotor position detector of an electrical machine, and, particularly, but not exclusively, of a switched reluctance machine.

2. Description of Related Art

The characteristics and operation of switched reluctance systems are well known in the art and are described in, for example, "The characteristics, design and application of switched reluctance motors and drives" by Stephenson and Blake, PCIM'93, Nürnberg, 21-24 Jun. 1993, incorporated herein by reference. A general treatment of the drives can be found in various textbooks, e.g. "Electronic Control of Switched Reluctance Machines" by T J E Miller, Newnes, 2001, incorporated herein by reference. FIG. 1 shows a typical switched reluctance drive in schematic form, where the switched reluctance motor 12 drives a load 19. The input DC power supply 11 can be either a battery or rectified and filtered AC mains. The DC voltage provided by the power supply 11 is switched across the phase windings 16 of the motor 12 by a power converter 13 under the control of the electronic control unit 14.

The switching must be correctly synchronized to the angle of rotation of the rotor for proper operation of the drive, and a rotor position transducer ('rpt') 15 is typically employed to supply signals corresponding to the angular position of the rotor. The rpt 15 is a device that outputs a binary signal having two transitions per machine phase and is periodic with an electrical cycle of the machine. The transitions are indicative of events in the electrical cycle of the machine, for example occurrences of maximum and minimum inductance, or positions closely adjacent such events, in relation to which a control action is to take place. Such devices are relatively inexpensive compared with the more accurate resolvers or encoders which are typically employed on servo systems which require high positional accuracy.

Many different power converter topologies are known, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A resistor 28 is connected in series with the lower switch 22 to provide a current feedback signal. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter. A polyphase system typically uses several "phase legs" of FIG. 2 connected in parallel to energize the phases of the electrical machine. Instead of the current-measuring resistor, an isolated and/or non-invasive current detector may be used.

The phase inductance cycle of a switched reluctance machine is the period of the variation of inductance for the, or each, phase, for example between maxima when the rotor poles and the relevant respective stator poles are fully aligned. An idealized form of the inductance curve for a phase is shown in FIG. 3(a). In practice, the sharp corners at Lmin and Lmax are rounded due to flux fringing and to saturation of the magnetic circuits. The maximum value of inductance would also be current dependent. Nevertheless, this curve is useful to illustrate the general behavior of the machine. As explained in more detail in the Stephenson paper cited above, the maximum inductance region, Lmax, is centered around the rotor position where a pair of rotor poles are fully aligned with a pair of stator poles. This is shown for a 3-phase, 6-pole stator, 4-pole rotor machine in FIG. 3(b). Similarly, the minimum inductance region, Lmin, corresponds to the position where the interpolar axis on the rotor is aligned with the stator pole axis, as shown in FIG. 3(c).

The performance of a switched reluctance machine depends, in part, on the accurate timing of phase energization with respect to rotor position. Detection of rotor position is conventionally achieved by using a transducer 15, shown schematically in FIG. 1, such as a rotating toothed disc mounted on the machine rotor, which co-operates with an optical or magnetic sensor mounted on the stator. A pulse train indicative of rotor position relative to the stator is generated and supplied to control circuitry, allowing accurate phase energization. Typically, a single sensor is used for 1- and 2-phase systems; three sensors for a 3-phase system; and either 4 or 2 sensors for a 4-phase system. Simpler arrangements using only one sensor are occasionally used in systems with more than three phases.

FIG. 4 shows in schematic form the essential components of such a rotor position transducer (rpt) for a 3-phase system. The vane 40 has a number of castellations which equals the number of rotor poles and is proportioned so as to give an equal mark:space ratio on the outputs of the three sensors. The sensors are distributed around the perimeter of the vane at angles which correspond to the displacement angles of the inductance profiles of the phases, and are typically set relative to the stator poles to give rising and falling edges at $L_{min}$ and $L_{max}$, respectively. This results in the signals from the sensors having relationships with the inductance profiles of the phases as shown in FIG. 5. As stated above, the rpt 15 is a device that outputs a binary signal having two transitions per machine phase and is periodic with an electrical cycle of the machine. The transitions are indicative of events in the electrical cycle of the machine, for example occurrences of maximum and minimum inductance, or positions closely adjacent such events, in relation to which a control action is to take place. These signals are typically used by the control system to generate the correct instants for energization of the windings of the machine. Since the performance of the machine is critically dependent on the accuracy of such energization, it is important that the components of the rpt are accurately made and aligned.

Several sources of error are commonly found in the rpt. The mark:space ratio of the vane obviously affects the mark:space ratio of the output signal, though the relationship is not entirely straightforward, since it is affected by the properties of the type of sensor used in the rpt. For example, if the sensor is of the optical type, it will have a finite beam width. This will influence the signal differently, depending on whether the transition is from transmitting to obscuring or vice versa. If the sensor is of the Hall-effect type, then the proximity of the incoming edge of the ferromagnetic vane will give rise to fringing of the magnetic flux and earlier switching than would be expected. In addition, both of these types of sensor can suffer from hysteresis effects, giving variations in signal output depending on the direction of rotation. In order to counter these effects, it is known to adjust the physical mark:space ratio of the vane so as to give a sensor output which is more nearly unity mark:space. It is also known to offset the alignment of the vane on the rotor in order to at least partially compensate for hysteresis, beam-width and fringing effects. Nevertheless, it is not usually possible to compensate simultaneously for all the errors, so at least some errors usually remain in the output signals. While it is possible to use high-cost, high-accuracy sensors, the cost involved has a serious impact on the overall cost of the drive.

These errors, however, are only part of the problem. It will be evident from FIG. 4 that both the absolute position of a sensor relative to the stator and its relative position to the other sensors will affect the phase of the $RPT_A$, $RPT_B$ and $RPT_C$ signals relative to the inductance profile of their phase. Methods have therefore been developed to reduce manufacturing errors in the placement of the sensor components, which are normally arrayed on a printed circuit board. For example, U.S. Pat. No. 5,877,568 and U.S. Pat. No. 6,661,140, both incorporated herein by reference, both disclose methods of improving the alignment of the sensors with the stator, though at the expense of additional components and manufacturing processes.

Similarly, the alignment of the vane relative to the rotor poles affects the phase relationship of the rpt signals with the respective inductance profiles. Among known methods for reducing this error is that disclosed in U.S. Pat. No. 5,786,646, incorporated herein by reference, which uses a specially designed clamp ring and appropriate tooling to fix the vane in a known relationship with the rotor poles.

These methods, while going at least some way to improving the quality of the rpt output, are expensive in terms of added components, manufacturing processes and/or set-up costs. While this may be acceptable in high-value drives manufactured in low volumes, it is not desirable for low-cost, high-volume drives as used in, e.g., domestic appliances or automotive systems. Nevertheless, such systems still require accurate rpt signals to produce the high output required of them. There is therefore a need to compensate for the error in the rpt signals in a repeatable and cost-effective way.

SUMMARY OF THE INVENTION

The techniques discussed in this patent application are distinct from compensations used in resolver or encoder systems. Such systems have high resolution over a mechanical revolution. Compensation for their circumferential misalignment with respect to a shaft can be done by reading, say, the encoder output at two positions and noting the offset in its output. This may be a few counts of position, but can never be less than the resolution of the encoder. Embodiments of the invention, however, allow correction of an error which is much less than the resolution of the rpt (but still significant with respect to the performance of the drive system).

Embodiments of the invention effectively observe an event at a position of the rotor in an electrical machine and compare the observed occurrence of the event with the output of the rotor position transducer. One such event is the position of the rotor coincident with maximum inductance. While it has been considered possible, in the prior art, to improve the accuracy of the output of an rpt by means of extra on-board hardware and/or accurately setting up the rpt, embodiments of the invention rely upon an initial characterization of the errors which can be loaded and used in the processing of the rpt signals. The rpt signal is taken and compensated according to the loaded compensation information. This is particularly attractive in the production of high volume electrical machines in which any increase in hardware cost is to be avoided if possible. Likewise, elaborate set-up schemes to establish an accurate rpt output are not generally appropriate to high volume production.

According to embodiments of the invention, the rotor is driven to create the event in the phase inductance cycle of the machine. One way of creating the event is to energize the machine itself to move the rotor to the event position. Alternatively, an external drive can be used to move the motor as necessary.

According to embodiments of the invention, a suitably calibrated encoder can be used to provide definitive rotor position information against which the accuracy of the rotor position transducer can be checked.

In a static form of assessment of rotor position transducer error, the rotor of the machine is moved to positions and the encoder value is noted. In a dynamic form of assessment, the rotor is moved and the encoder values noted as the rotor passes appropriate points.

Once the assessment is carried out, the offset for the rotor position transducer can be stored and used without the need for extra hardware.

BRIEF DESCRIPTION OF THE DRAWINGS

Embodiments of the invention will be described with respect to the figures, in which like reference numerals denote like elements, and in which.

DETAILED DESCRIPTION

The illustrative embodiment to be described uses a 3-phase switched reluctance drive in the motoring mode, but any phase number can be used, with the drive in either motoring or generating mode, i.e. producing output as a torque or force, or as electrical power, respectively.

Figure 1:
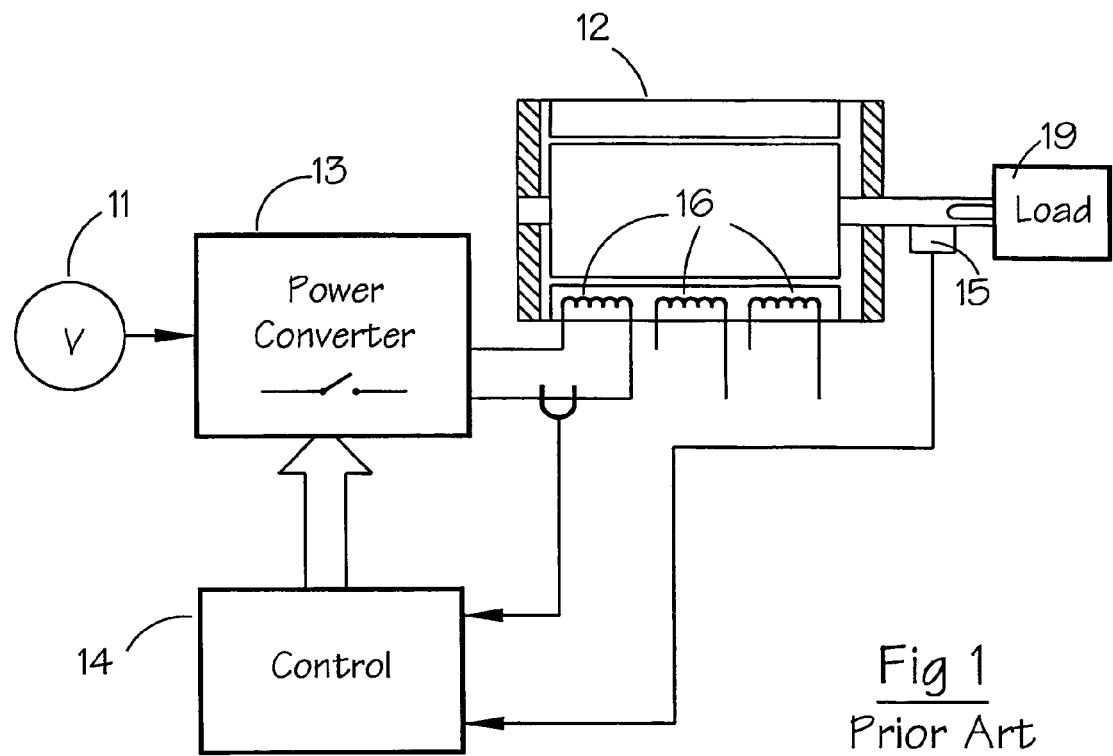
FIG. 1 shows a typical prior art switched reluctance drive.
Figure 2:
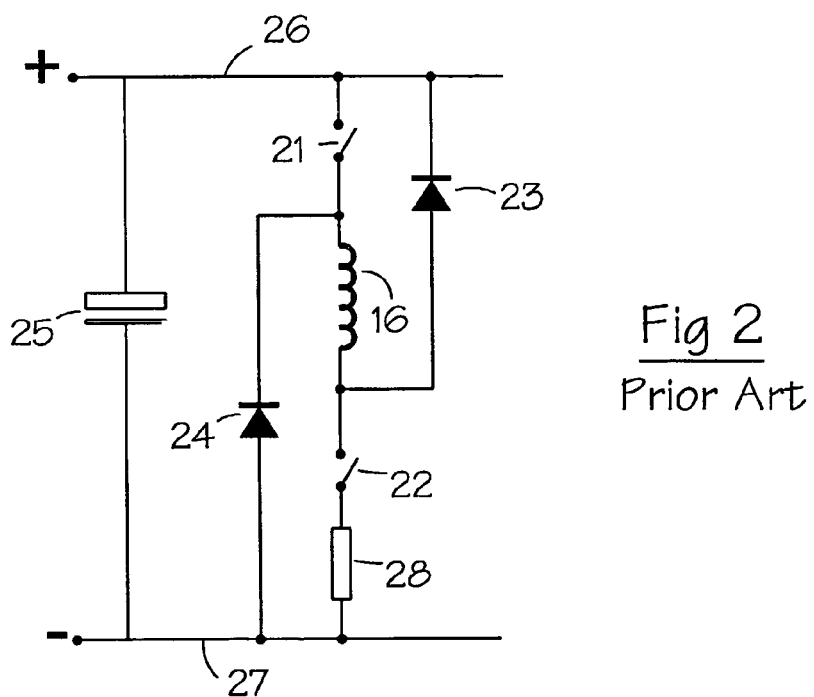
FIG. 2 shows a known topology of one phase of the converter of FIG. 1.
Figure 6:
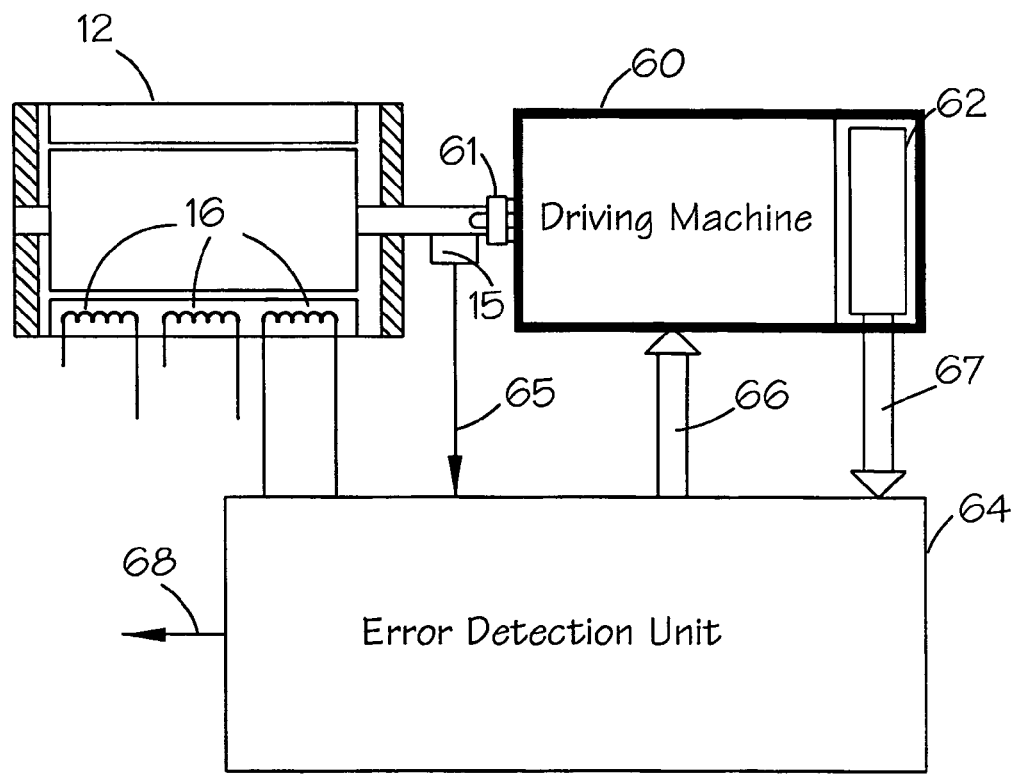
FIG. 6 shows an apparatus according to one embodiment of the invention.

Referring to FIG. 6, a switched reluctance ('SR') machine 12 as shown in FIG. 1 is connected to a driving machine 60 which is an electric motor in this embodiment, but also may conceivably be a drive of another type. In a practicable embodiment, the apparatus comprises a rig for the automated assessment and loading of an offset to compensate for error in the rotor position transducer. The machine with the rpt 15 to be assessed is mounted in the rig and coupled to the apparatus. A coupling 61 connects the output shaft of the driving machine 60 to the shaft of the SR machine 12. The coupling can be by any known method: e.g. by using a proprietary coupling, or by locating on a feature on the machine shaft, e.g. a keyway, spline or securing nut, or by simply pressing the end of the SR machine shaft against the shaft of the driving machine 60 to effect a friction engagement between the two. A cup or cone-shaped end on one of the shafts adapted to receive the other of the shafts will enhance the friction engagement. For high-volume throughput, the machine 12 may be held in a quick-release fixture to allow for rapid installation and removal.

Figure 4:
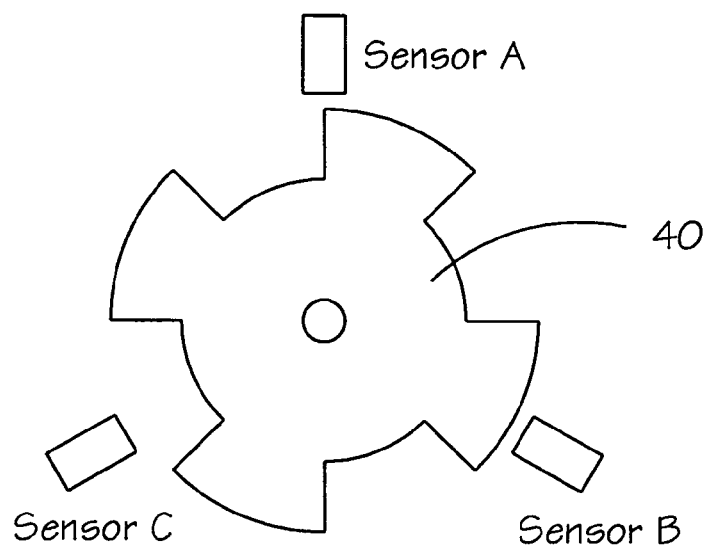
FIG. 4 shows the elements of a rotor position transducer for a 3-phase system.
Figure 5:
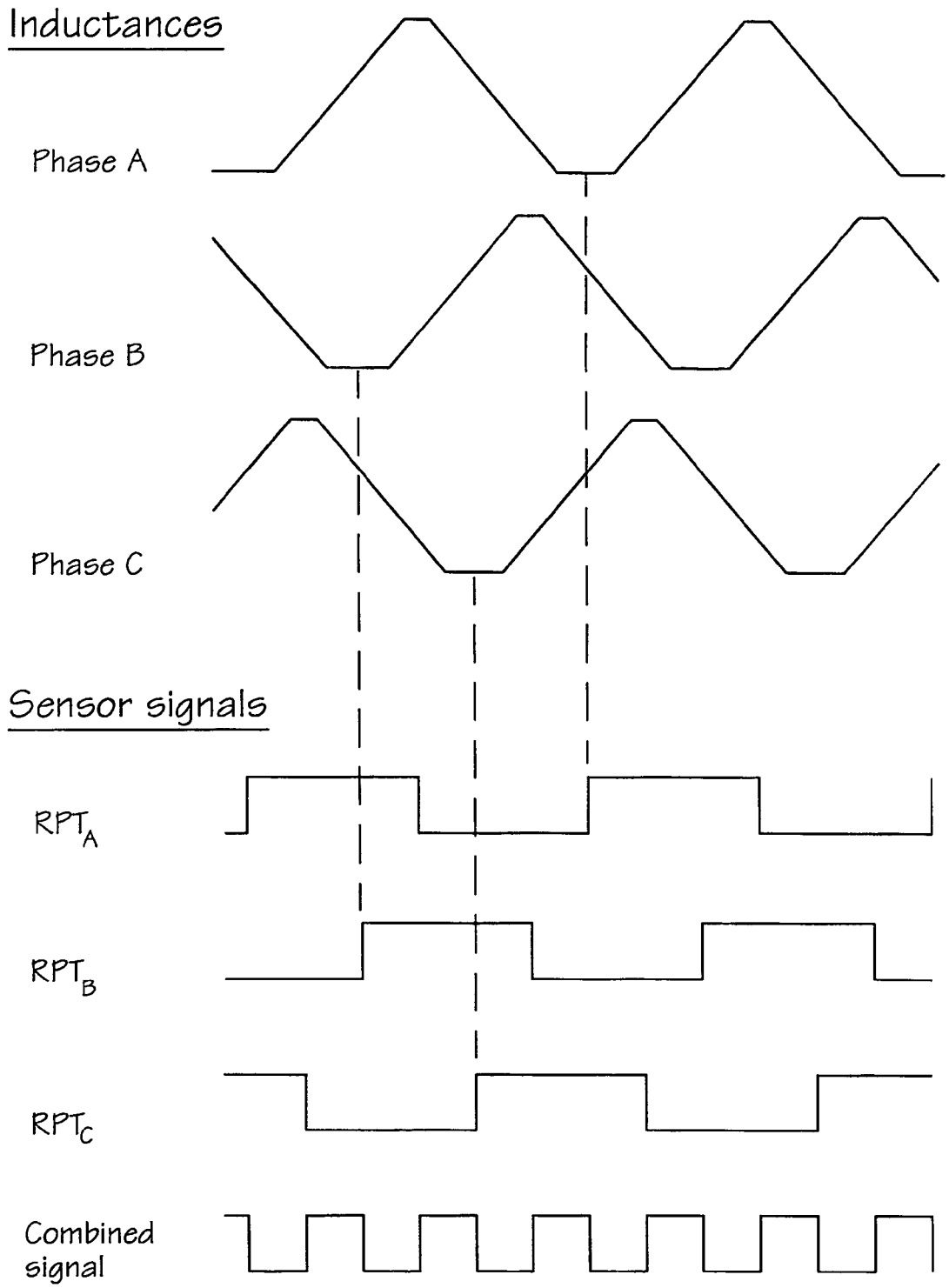
FIG. 5 shows the relationship between the inductance profiles and sensor signals for the transducer of FIG. 4.

The rpt is as shown in FIG. 4 with an output relationship to the inductance cycle for each phase of the machine as shown in FIG. 5. The rpt has two transitions between binary output states, as shown in FIG. 5.

The driving machine 60 has its own calibrated position detection system 62. In one embodiment, the position detection system 62 is a high-accuracy system such as a 4096-line encoder which generates multiple signals each indicative of an angular position. In one embodiment, the encoder produces 1024 different codes in one phase cycle of the SR machine. This provides sufficient positional resolution for determining errors in the rpt 15, as will be described below. Other means of providing accurate position information on the occurrence of an event in the phase inductance cycle optionally are used. The signals from the position detection system 62 are supplied via a data bus 67 to an error detection unit 64 which, in this embodiment, includes a processor. The error detection unit 64 also receives sensor output signals from the rpt 15 of the machine under investigation and is connected to at least one phase winding 16 of the machine. It can also communicate with and drive the driving machine 60 via bus 66. The driving machine 60 can be any one of a number of known types but is a dc motor or a servo motor according to certain embodiments of the invention.

The error detection unit is able to compare the positions indicated by the rpt 15 (which contain the positional error to be compensated) with the accurate signals from the position detection system 62 and to produce an error signal on line 68. This can then be transmitted to the control system 14 of the machine under investigation (see FIG. 1) and stored as an offset to correct the rpt signals during normal operation of the machine 12 in service. Thus the apparatus shown in FIG. 6 is useable for a one-off analysis of a drive system at the end of its manufacture to determine the error(s) in the rpt system and to provide a means of permanently correcting them. This is achieved without additional or specialized components or manufacturing processes associated with the machine under analysis. Instead of the prior art methods of seeking to minimize the error in the rpt signals, embodiments of the invention accept that such errors occur and compensate for them so as to optimize the performance of the drive.

Embodiments of the invention address the errors in a rotor position transducer by monitoring the actual rotor position from the measured machine parameters and gauging the rpt offset at actual rotor positions at the appropriate intervals in the inductance cycle.

Figure 3A:
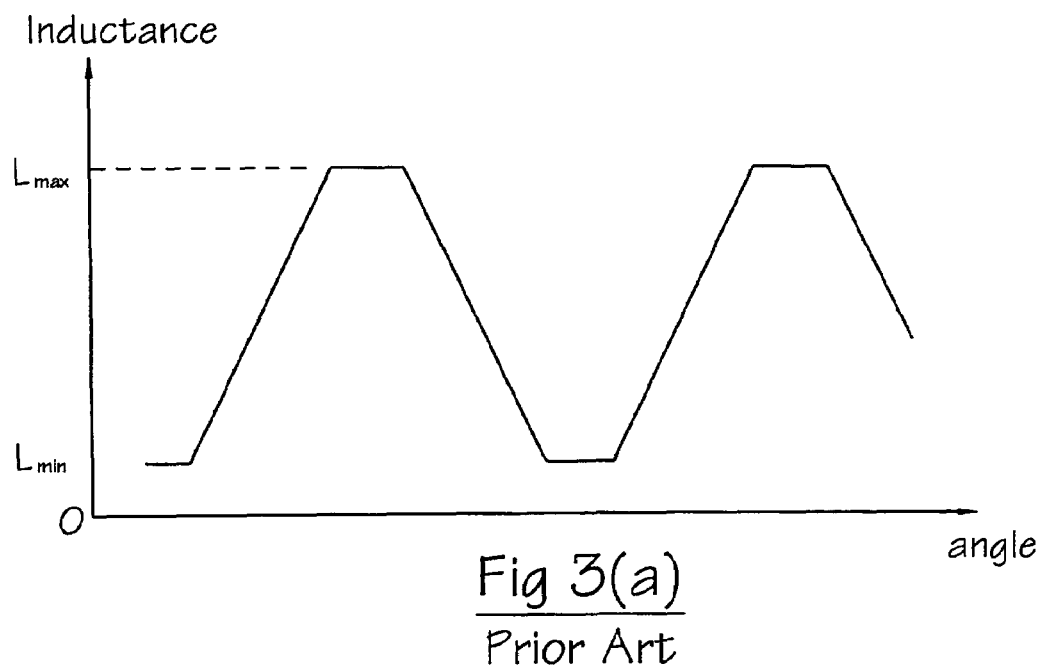
FIG. 3(a) shows an inductance profile of a switched reluctance machine as a function of rotor angle.
Figure 3B:
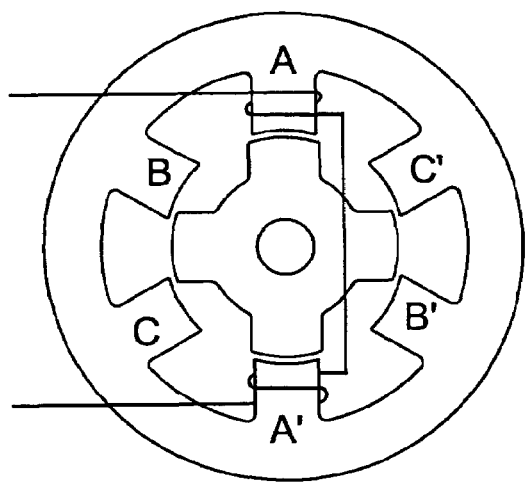
FIG. 3(b) shows a schematic view of a switched reluctance machine with the rotor in the fully aligned ($L_{max}$) position.
Figure 3C:
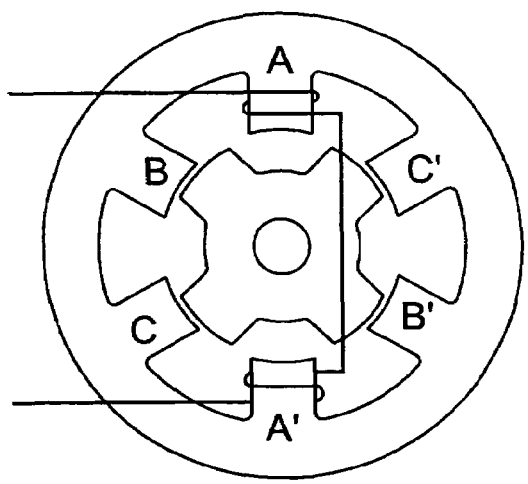
FIG. 3(c) shows a schematic view of a switched reluctance machine with the rotor in the fully unaligned ($L_{min}$) position.

One embodiment of the invention uses quasi-static readings of position to determine the required offset. Referring to FIG. 6, the SR machine under analysis is mounted in a jig and coupled to the driving machine 60. The output of the SR machine rpt 15 is connected to the error detection unit 64 as represented by signal 65. The nominated phase winding is connected for energization to the electrical power outputs from the error detection unit 64. In order to prevent the rotor settling in an unstable detent position (i.e. an $L_{min}$ occurrence), current is firstly applied to an adjacent phase and then removed to urge the rotor round. According to this technique, the adjacent phase is also connected to the electrical power outputs of the error detection unit. Alternatively, the rotor can be rotated by the driving machine operating at very low torque until the rotor takes up a stable detent position corresponding to $L_{max}$ for the nominated phase (A), as shown in FIG. 3(*b*). The rotor is then locked in the $L_{max}$ position of a nominated phase by applying a continuous energizing current to the phase winding. At that position, the output from the position detection system 62 is read from data bus 67. The current in the nominated phase is then reduced or removed and the driving machine 60 rotates the rotor until the rpt sensor signal for the nominated phase changes state, indicating $L_{max}$ from the rpt. At this point the output from the position detection system 62 is again read from data bus 67. The required offset can then be calculated from the difference in the two readings from the position detection system 62. This value of offset may be stored and used for all the phases to save time on analysis, or the procedure can be repeated with a second or more phases in the machine 12 so as to produce and store either several readings which may be averaged or one individual value of offset for each phase. Similarly, the process can be carried out on only one transition of the signal 65 or on several or all, allowing an average error to be calculated.

It will also be apparent that the rotor can be driven in the opposite direction and the error re-assessed, thus giving an indication of the amount of hysteresis present in the rpt system. As described above, an average value of error can be computed and stored or a separate value of error can be stored for each direction of rotation.

The stored error value(s) derived from the rpt calibration carried out is then applied by the machine control unit to the actual rpt signal transitions to compensate.

The descriptions above are based on the assumption that the rpt signals lag their true position (for the specified direction of rotation). If they lead their true position, then a transition will not occur for almost 180° (electrical) after $L_{max}$. This can be addressed by making a decision on the position of the transition by reference to the signals from the true position detector 62. Alternatively, if a transition in the signal 65 has not been detected within a specified angle of rotation, the driving machine can be driven in the reverse direction and the transition then detected on the other side of $L_{max}$.

The embodiments described above essentially operate in the rotor angle domain. It will be appreciated by those skilled in the art that the error detection unit 64 could, to a greater or lesser degree, be integrated with the control system of the drive 14 (see FIG. 1). Thus, it may be possible to employ the processing power of the control system to perform the necessary calculations and to store the resulting values of rpt error. It will be appreciated that the compensation for the error could be done in either the rotor angle domain or in the time domain and the choice between the two would be influenced by the particular control implementation used by the subject system. The ultimate goal, however, remains that of ensuring that the switches controlling the phase winding(s) are operated at the correct moments and that the operation is not compromised by any error in the rpt signal(s).

Another embodiment of the invention uses dynamic readings from the rpt 15 while the rotor is rotated, at constant or other speed. The error detection unit 64 interrogates a nominated phase winding to determine the inductance profile, using any one of a number of methods known in the art. According to one example, the phase is supplied with a small voltage using PWM diagnostic pulses. The inductance of the phase is then computed for each pulse, thus building up an inductance profile. The instants at which the features of the inductance profile (e.g. $L_{max}$ and $L_{min}$) occur are then compared with the instants at which the rpt signal changes state. By reference to the speed at which the rotor is being driven, the angular offset of the signal can then be determined. Alternatively, the encoder output can be counted as an ongoing measure of angle to give a direct angular offset value. This latter technique is not reliant on a constant rotor speed between readings. As with the static method, the value of offset may be used for all the phases, or the procedure can be repeated with the other phase(s) in the machine 12 so as to produce either several readings which may be averaged or one individual value of offset for each phase. The speed of rotation of the machine can be chosen to suit the accuracy of inductance profile required. This embodiment, and variants of it, essentially operate in the time domain.

The above descriptions have been based on the use of a high-accuracy, high-resolution position detection system 62. It will be clear to one skilled in the art and having the benefit of this disclosure that a position detection system with lower accuracy could be used, but with decreasing benefit as its resolution approaches the error of the rpt being calibrated.

The skilled person will appreciate that variations of the disclosed arrangements are possible without departing from the invention, particularly in the details of the implementation of the algorithms in the error detection unit. It will also be apparent that, while the technique has been described in relation to a switched reluctance machine, it can be used in relation to any machine using rotor position information in its control.

Also, while embodiments of the invention have been described in terms of a rotating machine, embodiments of the invention are equally applicable to a linear machine having a stator in the form of a track and a moving part moving on it. The word 'rotor' is used in the art to refer to the movable part of both rotating and linear machines and is to be construed herein in this way. Accordingly, the above description of several embodiments is made by way of example and not for the purposes of limitation. The present invention is intended to be limited only by the scope of the following claims.

What is claimed is:

1. A method of determining error in the output of a rotor position transducer providing binary signals and being arranged in relation to the rotor of an electrical machine to produce no more than two transitions in the binary signals in a phase inductance cycle, the method comprising;
    creating an event associated with at least one phase inductance cycle of the machine; and
    comparing the actual occurrence of the event with a transition in the output of the rotor position transducer to produce an error value.

2. A method as claimed in claim 1 in which the event is a rotor position coinciding with maximum or minimum inductance in the phase inductance cycle.

3. A method as claimed in claim 1 including driving the rotor in creating the event.

4. A method as claimed in claim 3 including driving the rotor to generate the transition from the rotor position transducer.

5. A method as claimed in claim 1 including energizing the machine to move the rotor to a position to create the event.

6. A method as claimed in claim 5 including energizing the machine to hold the said position of the rotor and externally driving the rotor to or from the event.

7. A method as claimed in claim 1 including externally driving the rotor to move the rotor to create the event and to generate the transition in the output from the rotor position transducer indicative of the event.

8. A method as claimed in claim 1 including storing the rotor position denoted by output of a position encoder at the event and comparing the stored position with a transition of the output of the rotor position transducer.

9. A method as claimed in claim 8 including counting the encoder output between the event and the transition in the output of the rotor position transducer to produce the error value.

10. A method as claimed in claim 8 including timing the period between two said positions to derive the error value from speed of the rotor.

11. A method as claimed in claim 1 including producing the error value for one phase of a polyphase machine, the error value being used for equivalent rotor position outputs for other phases of the machine.

12. A method as claimed in claim 1 including producing and storing a separate error value for each phase of a polyphase machine.

13. A method as claimed in claim 1 including producing a separate error value for each transition of the output of the rotor position transducer.

14. A method of compensating for error in the output of a rotor position transducer comprising storing the error value of claim 1 as an offset and applying the offset to the output of the rotor position transducer.

15. Apparatus for determining the error in the output of a rotor position transducer providing binary signals and being arranged in relation to a rotor of an electrical machine to produce no more than two transitions in the binary signals in a phase inductance cycle of the machine, the apparatus comprising:
    means for positioning the machine to create an event associated with at least one phase inductance cycle of the machine;
    means for monitoring for occurrence of the event; and
    means responsive to the means for monitoring for comparing the actual occurrence of the event with a transition in the output of the rotor position transducer to produce an error value.

16. Apparatus as claimed in claim 15 in which the means for monitoring is arranged to monitor rotor position coincident with maximum or minimum inductance of the phase inductance cycle.

17. A machine as claimed in claim 15 in which the means for positioning the machine is also arranged to drive the machine to generate the transition in the output of the rotor position transducer.

18. Apparatus as claimed in claim 15 including means for energizing the machine to move the rotor to a position to create the event.

19. Apparatus as claimed in claim 18 in which the means for energizing is arranged to energize the machine to hold the rotor in the said position, the apparatus further comprising external means for driving the rotor to or from the event.

20. Apparatus as claimed in claim 15 including external means coupled to the machine for driving the rotor to create the event and to create the transition in the output of the rotor indicative of the event.

21. Apparatus as claimed in claim 15 in which the means for monitoring includes an encoder coupled to the rotor, which encoder is operable to indicate the rotor position, and the means for comparing is arranged to compare the output of the encoder at the event with the output at the transition of the rotor position transducer to produce the error value.

22. Apparatus as claimed in claim 21 in which the means for comparing is arranged to count the encoder output between the event and the transition in the output from the rotor position transducer to produce the error value.

23. Apparatus as claimed in claim 21 in which the means for comparing is arranged to time the period between encoder outputs to derive the error value from the speed of the rotor.

24. Apparatus for compensating error in the output of a rotor position transducer comprising the apparatus of claim 15, means for storing the error value as an offset, and means for applying the offset to the output of the rotor position transducer to produce a compensated output of the rotor position transducer.

25. Apparatus as claimed in claim 24 including means for producing the error value for one phase of a polyphase machine, and means for applying the stored offset to the output of the rotor position transducer for equivalent positions in each phase of the machine.

26. Apparatus as claimed in claim 24 including means for producing an individual error value for each phase of a polyphase machine.

27. Apparatus as claimed in claim 24 including means for producing a separate error value for each transition of the output of the rotor position transducer.

28. A method as claimed in claim 1 wherein the comparing includes producing the error value so that it is representative of an offset between the actual occurrence of the event and the transition.

29. Apparatus as claimed in claim 15 in which the means responsive to the means for monitoring is arranged to produce the error value so that it is representative of an offset between the actual occurrence of the event and the transition.

* * * * *